(12) United States Patent
Losio et al.

(10) Patent No.: US 8,909,045 B2
(45) Date of Patent: Dec. 9, 2014

(54) MULTIPROTOCOL TRANSPORT USING POLARIZATION DIVISION MULTIPLEXING

(75) Inventors: Giacomo Losio, Tortona (IT); Gilberto Loprieno, Milan (IT); Theodor Kupfer, Feucht (DE)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 13/313,268

(22) Filed: Dec. 7, 2011

(65) Prior Publication Data

US 2013/0148965 A1   Jun. 13, 2013

(51) Int. Cl.
H04J 14/06 (2006.01)

(52) U.S. Cl.
USPC .......................................................... 398/65

(58) Field of Classification Search
CPC ....................................................... H04J 14/06
USPC .......................................................... 398/65
See application file for complete search history.

(56) References Cited

U.S. PATENT DOCUMENTS

| | | | |
|---|---|---|---|
| 6,868,236 B2 | 3/2005 | Wiltsey et al. | |
| 7,609,918 B2 | 10/2009 | Narevicius | |
| 2004/0096143 A1* | 5/2004 | Shpantzer et al. | 385/16 |
| 2008/0080860 A1* | 4/2008 | Katagiri | 398/43 |
| 2008/0159741 A1* | 7/2008 | Secondini et al. | 398/79 |
| 2010/0260254 A1 | 10/2010 | Kimmich et al. | |
| 2011/0229137 A1* | 9/2011 | Gripp et al. | 398/65 |
| 2011/0243574 A1* | 10/2011 | Essiambre et al. | 398/200 |
| 2011/0255870 A1 | 10/2011 | Grigoryan et al. | |
| 2013/0156443 A1* | 6/2013 | Lowery et al. | 398/141 |

FOREIGN PATENT DOCUMENTS

WO   2011126814   10/2011

OTHER PUBLICATIONS

International Search Report and Written Opinion in corresponding International Application No. PCT/US2012/063773, mailed Jan. 23, 2013.
Ebberg et al., "A Coherent OFDM Switching System for Flexible Optical Network Configuration", Journal of Lightwave Technology, vol. 11, No. 516, May/Jun. 1993, (pp. 847-853).
Noels et al., "Carrier Phase and Frequency Estimation for Pilot-Symbol Assisted Transmission: Bounds and Algorithms", Nov. 7, 2003, (9 pages).
Yao et al., "All-Optic Scheme for Automatic Polarization Division Demultiplexing", 2007 Optical Society of America, Jun. 11, 2007 / vol. 15, No. 12, Optics Express 7407, (8 pages).

(Continued)

*Primary Examiner* — Nathan Curs
(74) *Attorney, Agent, or Firm* — Edell, Shapiro & Finnan, LLC

(57) ABSTRACT

Using polarization modulation techniques to simultaneously transmit two different data streams (formatted according to two different protocols) over a single optical wavelength. A first data stream that is encapsulated for transport using a first transport protocol, and a second data stream that is encapsulated for transport using a second transport protocol are received. The first data stream is modulated on a wavelength with a first polarization mode of a polarization division modulation scheme to produce a first modulated data stream and the second data stream is modulated on the wavelength with a second polarization mode of the polarization division multiplex transmission scheme to produce a second modulated data stream having the second polarization mode. The second polarization mode is orthogonal to the first polarization mode. The first and second data streams are combined onto a single wavelength for transmission over a single optical fiber using a polarization beam combiner.

20 Claims, 5 Drawing Sheets

(56) References Cited

OTHER PUBLICATIONS

Randel et al., "6×56-Gb/s mode-division multiplexed transmission over 33-km few-mode fiber enabled by 6×6 MIMO equalization," Optical Society of America, Optics Express 16697, vol. 19, No. 17, Aug. 15, 2011.

Lidon, Maria, "Digital Pre-Compensation of Chromatic Dispersion in QPSK high speed telecom systems", Dec. 2011, 52 pages.

Rios-Muller et al., "Experimental Comparison between Hybrid-QPSK/8QAM and 4D-32SP-16QAM Formats at 31.2 GBaud using Nyquist Pulse Shaping", Sep. 2013, 3 pages.

Zhou et al., "High Spectral Efficiency 400 Gb/s Transmission Using PDM Time-Domain Hybrid 32-64 QAM and Training-Assisted Carrier Recovery", Journal of Lightwave Technology, vol. 31, No. 7, Apr. 1, 2013, pp. 999-1005.

Zhuge et al., "Time Domain Hybrid QAM Based Rate-Adaptive Optical Transmissions Using High Speed DACs", OFC/NFOEC Technical Digest, 2013, 3 pages.

* cited by examiner

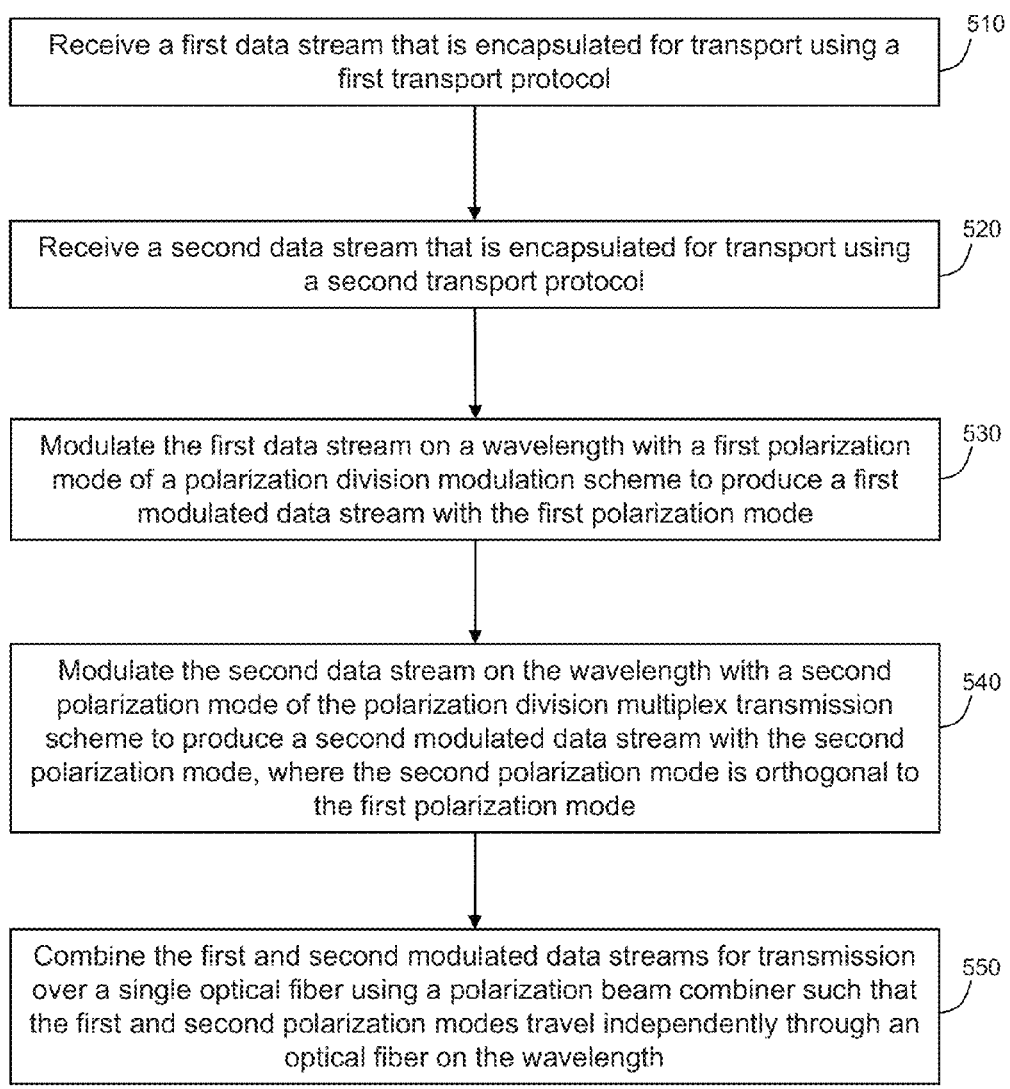

US 8,909,045 B2

MULTIPROTOCOL TRANSPORT USING POLARIZATION DIVISION MULTIPLEXING

TECHNICAL FIELD

The present disclosure relates to optical transmitters.

BACKGROUND

Time division multiplexing (TDM) networks have been used since the 1960's in telecommunications to digitally transmit voice. As such, TDM networks have been developed with a robust suite of tools, e.g., an Operations, Administration, and Management suite, which maintains a level of reliability that telecommunications operators have grown to expect. With the advent of optical networks, telecommunications operators have applied TDM to Synchronous Optical Networking (SONET) and Synchronous Digital Hierarchy (SDH) optical networks.

Over time, the telecommunications industry has experienced increasing economic pressure to integrate different services, e.g., by adding packet based services to TDM services. As demand for packet based services increases, e.g., Ethernet, there is a demand for convergence of the various services, such as, packet-over-TDM and TDM-over-Ethernet. However, packet based networks do not have the robust management tools available to TDM networks. Furthermore, integrating two or more types of networks and/or services require protocol convergence layers and common framing layers that add complexity to transporting the underlying data over the transport network.

BRIEF DESCRIPTION OF THE DRAWINGS

FIG. 5 depicts a flow chart for a specific example of operations of the PDM process.

DESCRIPTION OF EXAMPLE EMBODIMENTS

Overview

Figure 1:
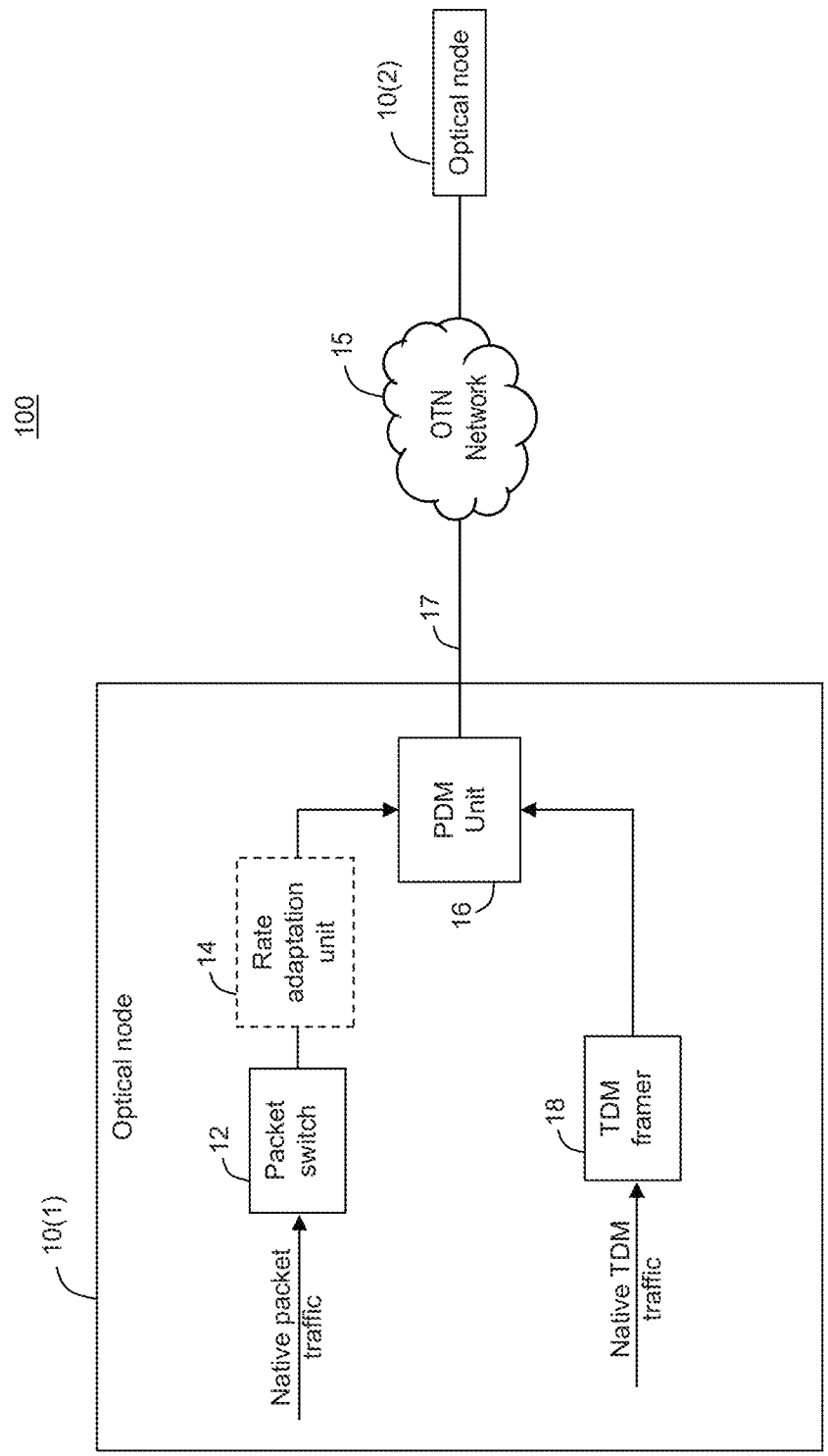
FIG. 1 is a block diagram showing an example of a system comprising first and second optical nodes configured to exchange different data types using respective polarizations of an optical wavelength.

Techniques are provided herein for using polarization modulation techniques to simultaneously transmit two different data streams (formatted according to two different transport protocols) over a single optical wavelength. A first data stream that is encapsulated for transport using a first transport protocol, and a second data stream that is encapsulated for transport using a second transport protocol are received. The first data stream is modulated on a wavelength with a first polarization mode of a polarization division modulation (PDM) scheme to produce a first modulated data stream having the first polarization mode, and the second data stream is modulated on the wavelength with a second polarization mode of the polarization division multiplex transmission scheme to produce a second modulated data stream having the second polarization mode. The second polarization mode is orthogonal to the first polarization mode. The first and second data streams are combined onto a single wavelength for transmission over a single optical fiber using a polarization beam combiner, such that the first and second polarization modes travel independently through an optical fiber on the single wavelength.

The first data stream may comprise native packet based traffic and the second data stream may comprise native TDM traffic, each of which are generated independently and may be synchronous or asynchronous data streams. The first and second data streams are combined onto a single wavelength without a common framing layer or a convergence layer. The process for combining and transmitting the independently generated data streams is referred to herein as a multiprotocol PDM process. These techniques apply to any data streams regardless of the underlying protocols Example Embodiments Referring first to FIG. 1, a system 10 is shown comprising first and second optical nodes 10(1) and 10(2) that are coupled to each other by an optical fiber 17 over an optical transport network (OTN) 15. Optical node 10(1) comprises a packet switch unit 12, a time division multiplexing (TDM) framer 18, and a polarization division modulation (PDM) unit 16. The packet switch unit 12 encapsulates native packet-formatted traffic, while the TDM framer 18 encapsulates native TDM traffic, both for transport over OTN network 15. According to the techniques described herein, the PDM unit 16 modulates packet traffic on one polarization of a wavelength and TDM traffic on another polarization of the wavelength. As used herein, a wavelength represents light at a single wavelength or frequency.

One problem encountered in mixed traffic networks is synchronization. TDM networks typically employ synchronous networks, e.g., SDH and SONET, to ensure proper delivery of real-time traffic such as telephone calls. This poses a problem when transmitting real-time traffic over packet based networks since many packet based networks do not guarantee on-time delivery of data. Synchronization issues have been somewhat mitigated by the adoption of synchronized Ethernet (SyncE) and IEEE 1588 version 2. However, these intermediate solutions do not provide the same performance as TDM.

Furthermore, many protocol solutions have been proposed to allow traffic grooming to encapsulate packet traffic in TDM wrappers, or to segment and reassemble TDM formatted traffic over packet networks, etc. Yet most of the solutions fail to address some of the telecommunications requirements while adding complexity and cost to the system design. In general, when a homogeneous protocol is used for transport there is a level of aggregation in the electrical domain to converge the differing protocols onto one protocol for transport. The convergence layer chips (semiconductors) are complex, expensive, and are often realized in field programmable gate arrays (FPGAs) or custom designed application specific integrated circuits (ASICs). Complementary integrated circuit chips are needed at the receiver to separate the traffic types.

The convergence layer chips increase the cost of transport, and require separate code development and test. Furthermore, there is a need to develop dedicated performance monitoring and Operations, Administration, and Management (OAM) suites. Standardization of convergence layers can take years, e.g., transport multi-protocol label switching (T-MPLS) is being replaced by MPLS-transport protocol (TP), and Provider Backbone Transport (PBT) is being replaced by Provider Backbone Bridge Traffic Engineering (PBB-TE). In addition, many telecommunications operators will not allow TDM traffic to be transported over a packet based transport platform due a lack of a pervasive and standardized OAM, fault propagation and security issues, and a lack of reliability in packet based synchronization, e.g., IEEE 1588 or SynchE.

On the receiver side, i.e., within optical node 10(2), the polarizations of the wavelength are separated, e.g., using a polarization beam splitter (PBS). Once separated the packet based and TDM based traffic are separately demodulated to recover the separate data streams comprising the native packet traffic and the native TDM traffic. To recover each of the traffic types, which may be generated independently, the receiver in optical node 10(2) has a separate clock recovery unit for each of the data streams. In other words, each of the data streams may be generated independently using different data rates and different clocks.

To simplify operations at the receiver, optical node 10(1) may employ an optional rate adaptation unit 14; the optional nature of this block being indicated by the dashed line. The rate adaptation unit 14 throttles packet based traffic to match the clock rate for the TDM traffic using known traffic metering techniques, e.g., backpressure or Inter Packet Gap (IPG) insertion. By virtue of the rate adaptation unit 14 a single clock recovery unit at the receiver may be used to recover both the native packet traffic and the native TDM traffic.

Figure 2:
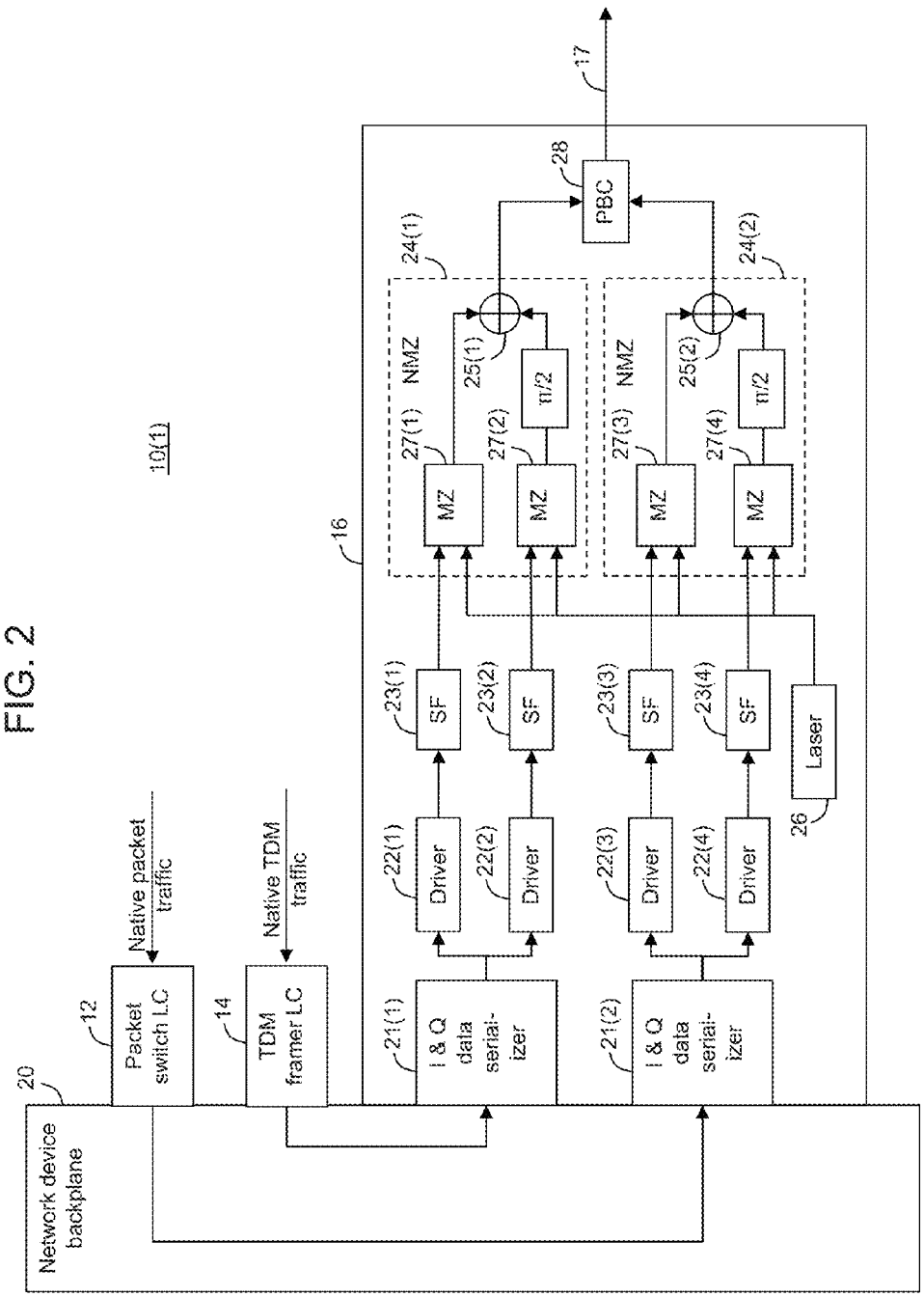
FIG. 2 is an example block diagram of an optical node depicted in FIG. 1.

Reference is now made to FIG. 2 which depicts one example of selected components of optical node 10(1). FIG. 2 depicts the packet switch unit 12 and the TDM framer 14 as line cards (LCs) as part of a network appliance. In another example, the line cards 12 and 14 may also be subsystems of a single line card and the backplane connects the line card to the optical module. The optical node 10(1) also comprises the PDM unit 16. In this example, the packet switch unit 12, the TDM framer 14, and the PDM unit 16 are coupled to each other by a backplane 20.

In FIG. 2 it is assumed, as an example, that the modulation scheme used in the optical network is quadrature amplitude modulation (QAM) with an in-phase (I) and quadrature (Q), e.g., 90 degree out of phase, components. Each of the packet switch data and the TDM data can be separated into I and Q components. In this example, the packet switch LC and the TDM framer LC send their respective data in parallel fashion across backplane 20 to I and Q data serializers 21(1) and 21(2). I and Q data serializers 21(1) and 21(2) multiplex and precode the data into separate I and Q components and send them to driver units 22(1)-22(4). The PDM LC 16 comprises digital-to-analog (DAC) conversion driver units 22(1)-22(4) that provide analog voltages to shaping filters 23(1)-23(4), respectively. In turn, the shaped waveforms are provided to Nested Mach-Zehnder (NMZ) modulators 24(1) and 24(2) for modulation onto a wavelength. The NMZs use Mach-Zehnder (MZ) modulators 27(1)-27(4) as shown in FIG. 2 for respective I and Q components, provide the requisite 90 degree phase shifts ($\pi/2$), and combine the components using combiners 25(1) and 25(2). The outputs of NMZs 24(1) and 24(2) are combined by polarization beam combiner (PBC) 28 for output on a single wavelength over fiber 17. A laser driver 26 provides the optical laser energy at the correct frequency (wavelength) to the NMZs 24(1) and 24(2).

It should be understood that the representations depicted in FIGS. 1 and 2 are oversimplifications of the actual network environment. The optical nodes may be part of a larger network, e.g., a metropolitan area network (MAN) or a wide area network (WAN). Many components, e.g., routers, switches, combiners, splitters, and optical/electrical conversion, are omitted for simplicity. The optical nodes 10(1) and 10(2) may be part of reconfigurable add/drop multiplexers (ROADMs) or optical switches. In this regard, the PDM unit 16 may add data to a wavelength and node 10(2) may drop a wavelength. For example, PDM unit 16 may aggregate 40 gigabit Ethernet (40 GE) data from a local area network (LAN) and voice data from a private branch exchange (PBX) that are ultimately encapsulated as an Optical Transport Unit (OTU) frame modulated on separate polarization modes on a wavelength. That is, the aggregated data are "added" to fiber 17 on a single wavelength. Likewise, the respective data are "dropped" at the optical node 10(2) as viewed in FIG. 1 to their respective packet and TDM networks.

Figure 3:
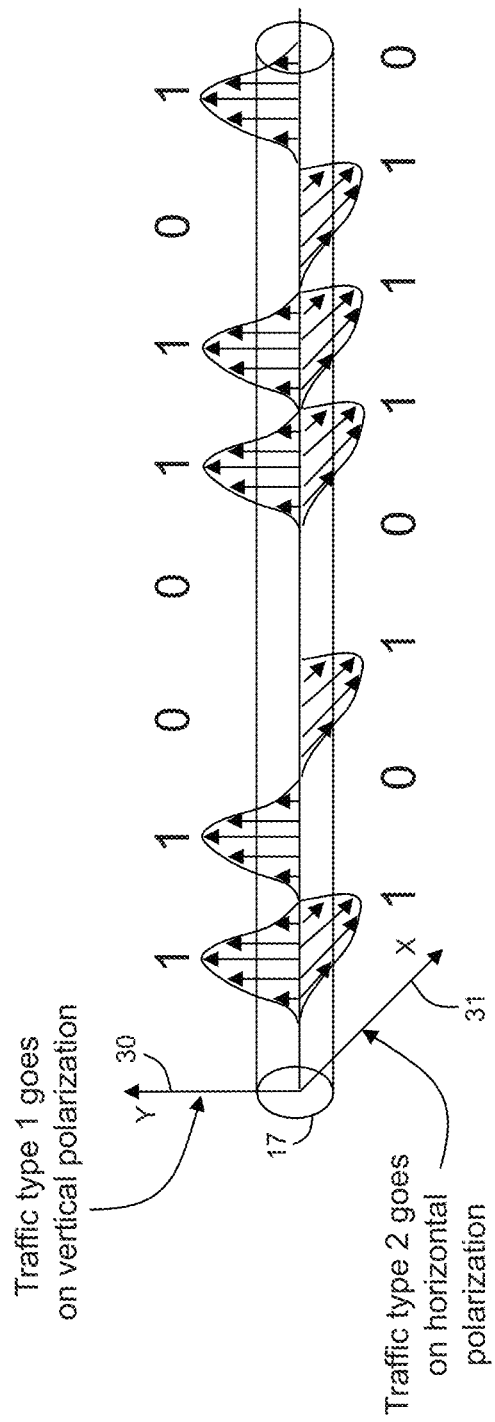
FIG. 3 is a diagram showing an example of data transmission of two different transport types using two polarizations in a polarization division multiplexing (PDM) transmission scheme.

Turning to FIG. 3, a simplified representation is shown for the manner in which multiple traffic types may be transported on a single wavelength over fiber 17. In this example, a simple modulation scheme is depicted, e.g., amplitude modulation. A first traffic type, e.g., packet based traffic is modulated on a vertical polarization 30 of a wavelength and a second traffic type, e.g., TDM traffic, is modulated on a horizontal polarization 31 of the wavelength. The vertical polarization 30 and the horizontal polarization 31 may be referred to herein as Y ands X polarizations, respectively.

In this example, power on the wavelength on a polarization leads to transmission of a logic "1" and lack of power is interpreted as transmission of a logic "0." The same applies to the other polarization. It should be understood that the transmissions of ones and zeros may be made by various amplitude or phase shifts, or according to other known modulations schemes, e.g., phase shift keying, in the digital or analog domains.

The two flows are generated and kept separate by using a specific LC architecture and the associated polarization multiplexing by the optical transmitter and demultiplexed by the receiver. Each of the two streams is transported on respective polarizations, thereby eliminating the complexity of having to "groom" the two incoming data streams, e.g., to encapsulate packet over TDM, or to segment and reassemble TDM for transport on packet switched networks. In one example, TDM is transported on one polarization and packet traffic on another polarization. This concept applies to any mix of data streams, synchronous or asynchronous, e.g., 40 Gigabit Ethernet (GE) channels, Optical Transport Unit (OTU) channels, or combinations of both.

In the general case, the signals on the two polarizations run at two different bit rates and the receiver uses independent clock recovery on each polarization. For example, one polarization could be used for 40 GE and the other polarization could be used for OTU3. The two data streams may be arranged for synchronous transmission, e.g., by matching the data rate of the asynchronous stream to that of the synchronous stream. By synchronizing the streams, the stream recovery at the receiver is simplified since the receiver can employ a single clock recovery block. In this example, the two data streams are be clocked out of the transmitter using a TDM layer clock (which is synchronous by nature) and the packet data rate is adapted using the standard techniques, e.g., IPG adjustment or backpressure as mentioned above.

One advantage of these techniques is that the two streams share the same wavelength. Furthermore, the OAM may be provided by TDM technology, whether the TDM is SDH, SONET, or OTN, and thereby fulfills a key requirement for transport quality demanded by most service providers.

The PDM unit 16 may add training sequences or any other framing needed by the receiver to recover the data streams, e.g., to detect the QAM constellations, by compensating for Polarization Mode Dispersion (PMD). If there is a framing on both streams using a known framing distance (time distance), the equalizer algorithm at the receiver can recover both streams more consistently, or the equalizer filter may be made large enough to capture a larger framing distance. In the receiver equalizer there is a time-variant filter which compensates for PMD. PMD is a delay of the two polarization modes against each other, i.e., one polarization will travel faster down the fiber that the other, even though they were launched at the same time.

The equalization filter is initialized with either the actual delay (a first case) between the two polarization modes obtained by measuring the distance between two known frames or initialized with a 0 delay (a second case). In a second case the equalizer needs to be able to compensate for twice the amount of delay. By way of example, for the first case, if the actual delay is +100 picoseconds (ps) and varies over time to minus (−) 100 ps, the filter is initialized with +100 ps delay and tracks the delay to −100 ps. In the second case, the filter is initialized with 0 ps delay and tracks the delay to −200 ps (as a relative delay). As another example for the first case, if the actual delay is −100 ps and varies over time to +100 ps, the filter is initialized with −100 ps and tracks the delay to +100 ps. In the second case, the filter is initialized with 0 ps and needs to track the delay to +200 ps. The first case uses a filter compensation capability of +/−100 ps while in the second case the filter compensates over a range of +/−200 ps.

One possible modulation format is polarization multiplexing-quadrature phase shift keying (PM-QPSK) but these concepts apply to any polarization multiplexed modulation format, e.g., N-QAM or PM-differential QPSK (PM-DQPSK). The two traffic streams are fed separately to the PM-QPSK transceiver and encoded over separate polarizations and two polarizations will travel independently through the fiber. It should be noted that any two (or more) streams launched orthogonally into the fiber can be recovered at the other end of the fiber, whether orthogonal polarizations or orthogonal modes of a multimode transmission scheme are used.

The two polarizations travel independently through the fiber, and the transmission is on a single wavelength and on a single fiber as if the different data types were combined at electrical level. However, the two polarizations are groomed at the optical level and data are delivered to the downstream devices in two independent flows as they were transmitted on separate channels. The two polarizations are coherently separated by the receiver. The data are processed by a processor, e.g., a digital signal processor (DSP), that compensates for transmission impairments such as chromatic dispersion or polarization mode dispersion, i.e., the DSP computationally reverses the effects of optical propagation. Accordingly, the techniques provided herein remove the need to aggregate multiple data types at the transmitter into a single layer, even when using different protocols or different bit rates, and the data types travel independently on the two polarizations of a single wavelength.

Figure 4:
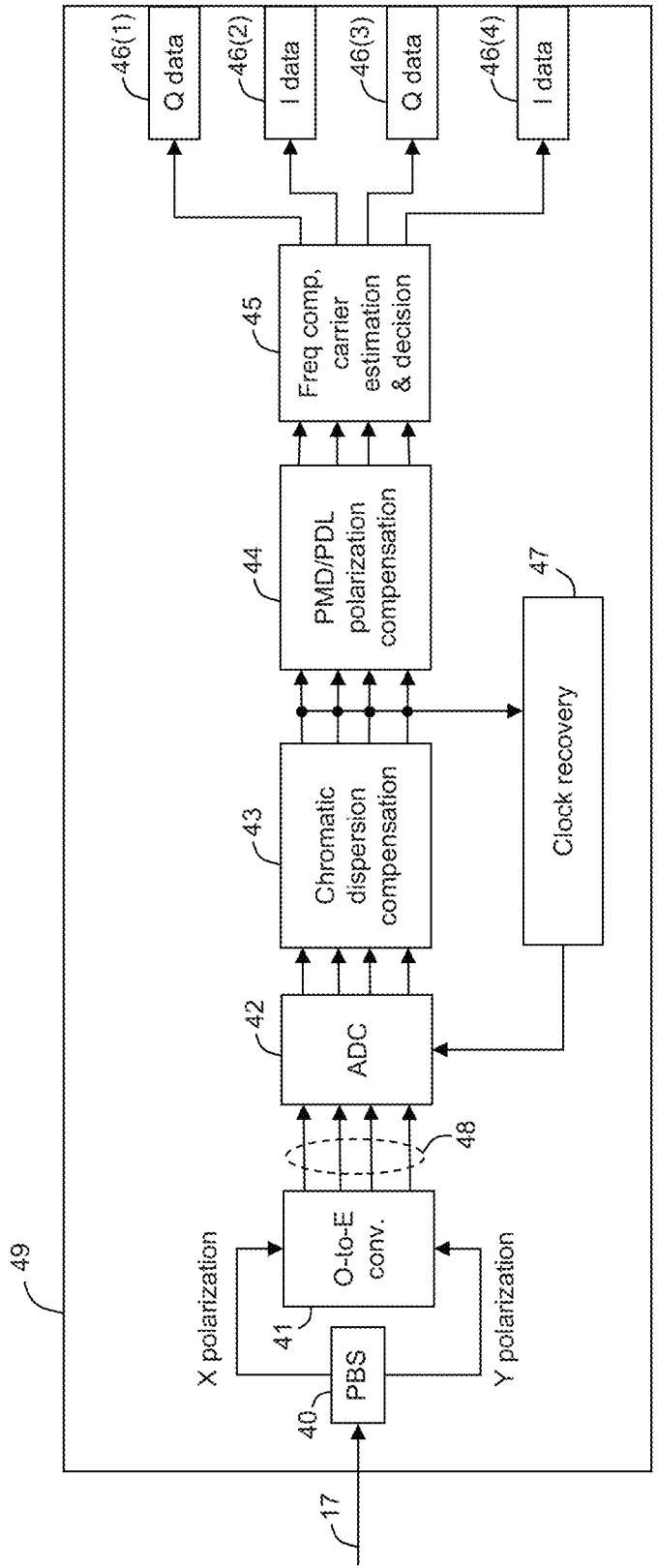
FIG. 4 is a block diagram showing an example of a receiver configured to recover different data types received on respective polarizations of an optical wavelength.

Referring to FIG. 4, an example of a block diagram of a receiver 49 is shown, e.g., a receiver used by optical node 10(2) for recovering different data streams from each wavelength polarization. The receiver comprises a PBS 40; an optical-to-electrical (O-to-E) conversion block or unit 41; an analog-to-digital converter (ADC) 42; a chromatic dispersion (CD) compensation unit 43; a polarization mode dispersion (PMD) and polarization dependent loss (PDL) polarization compensation unit 44; a frequency compensation, carrier estimation, and decision unit 45, I and Q data outputs 46(1)-46(4), and a clock recovery unit 47

The PBS 40 is coupled to fiber 17 (FIGS. 1-3) and splits the polarizations, e.g., the vertical Y and horizontal X polarizations, into two beams. The labeling of each X and Y polarization in FIG. 4 is arbitrary and is for ease of illustration. Each polarization is sent to the O-to-E conversion unit 41 where the optical energy is converted to electrical signals. The O-to-E conversion unit 41 may employ hybrid couplers or other components to separate the phase components within each polarization. The amplitude of the signal in each phase is detected using, e.g., a photo diode. The O-to-E conversion unit 41 outputs I and Q analog streams for each polarization shown collectively at reference numeral 48. The streams 48 are each converted to digital form by ADC 42.

Once converted to digital form, the signals are digitally processed by the CD compensation unit 43 and the PMD and PDL polarization compensation unit 44, to compensate for the effects of the respective dispersion modes. The digital streams are tapped between the CD compensation unit 43 and the polarization compensation unit 44 as viewed in FIG. 4 and fed to the clock recovery unit 47. Clock recovery unit 47 determines the signals' original clocking frequency that was used to clock the data at the sending node, e.g., optical node 10(1). The recovered clock signal is fed back to the ADC 42 to ensure proper digital signal conversion. When the two data streams sent by the transmitting device are synchronized, the receiver can employ a single clock recovery block, as described above.

After compensating for optical impairments the respective signals are forwarded to a frequency compensation, carrier estimation, and decision unit 45. Unit 45 performs frequency compensation and carrier phase estimation for coherent detection, and makes final bit decisions for output data. The detected I and Q data are fed to respective interface outputs 46(1)-46(4). The data output via outputs 46(1) and 46(2) are for one data stream and the data output via outputs 46(1) and 46(2) are for another data type. The output data are forwarded to their respective destinations.

In this example, the receiver 49 does not employ packet-over-TDM or TDM-over-Ethernet de-framing layers or convergence layer data flow separation chips, e.g., FPGAs or ASICs. Furthermore, the CD compensation unit 43, the polarization compensation unit 44, and decision unit 44, or other functions on the receiver 49 may be implemented in composite or dedicated chips, processors, or DSPs. Memory, e.g., random access memory (RAM), may be used in any of the devices depicted in the figures to facilitate their operation.

Reference is now made to FIG. 5. FIG. 5 shows a flow chart that generally depicts the multiprotocol PDM process 500. At 510, a first data stream is received that is encapsulated for transport using a first transport protocol. At 520, a second data stream is received that is encapsulated for transport using a second transport protocol. At 530, the first data stream is optically modulated on a (single) wavelength with a first polarization mode of a polarization division modulation (PDM) scheme to produce a first modulated data stream with the first polarization mode, and at 540, the second data stream is optically modulated on the (single) wavelength with a second polarization mode of the polarization division multiplex transmission scheme to produce a second modulated data stream with the second polarization mode. The second polarization mode is orthogonal to the first polarization mode. At 550, the first and second modulated data streams are combined for transmission over a single optical fiber using a polarization beam combiner such that the first and second polarization modes travel independently through an optical fiber on the single wavelength.

Techniques are further provided herein for generating the first data stream independently from the second data stream, i.e., the data stream may be from two independent sources. In other words, the sources may comprise, e.g., local area network (LAN) traffic, storage area network (SAN) traffic, video conference traffic, among others. The first and second data streams may be generated in synchronous or asynchronous form for transmission. For example, the first data stream may be generated for TDM network transmission and the second data stream may be generated for packet switched network transmission. The data transmission rate of the first or second data stream may be adjusted such that a clock recovery at a receiver receiving the single wavelength can use a single clock recovery mechanism (block) for optical to electrical conversion of the first and second data streams. In other words, the data transmission rate of one data stream is adjusted to match the data transmission rate of the other data stream.

The first and second data streams may be generated without a packet based or TDM based convergence layer, and without a common framing layer. The first data stream and the second data stream may be modulated according to one or more of an N-QAM modulation scheme and an N-phase shift keying (N-PSK) modulation scheme, where N represent known binary levels, e.g., 4-QAM, 32-QAM, 64-QAM, binary-PSK, 4-PSK, and the like. The modulation scheme for any given polarization is independent of the modulation used on another polarization.

In an alternate form, different traffic types may be transmitted using different modes of the optical fiber, e.g., using mode division multiplexing (MDM) or space-division multiplexing (SDM), hereinafter referred to as MDM. Multiple parallel transmission paths are available for MDM, and can be used on installed fiber bundles. In this respect MDM, e.g., over few-mode fiber (FMF) or multimode fiber (MMF) can be implemented. Modal crosstalk can be dealt with using multiple-input-multiple-output (MIMO) signal processing techniques. An MDM waveguide can individually address all propagation modes supported by MDM. The receiver is able to mode-selectively and coherently detect all propagation modes.

MIMO transmission over multimode fiber (MMF) may be made using mode-group-division multiplexing (MGDM) in fibers that allow the propagation of hundreds of modes. Using various coupling techniques, such as offset launch, groups of several tens of modes can be independently transmitted and received. Accordingly, by using MDM three or more traffic types may be transmitted over a single fiber using one or more wavelengths.

Accordingly, modulating of the first data stream may be made for transmission over a first propagation mode in an MDM scheme, and modulating of the second data stream may be made for transmission over a second propagation mode in the MDM scheme. The first and second data streams are launched orthogonally into a single optical fiber using a multimode beam combiner. The first and second propagation modes travel independently through optical fiber and are recovered at the receiver.

In sum, the techniques described herein involve receiving a first data stream that is encapsulated for transport using a first transport protocol, and a second data stream that is encapsulated for transport using a second transport protocol. The first data stream is modulated on a wavelength with a first polarization mode of a polarization division modulation scheme and the second data stream is modulated on the wavelength with a second polarization mode of the polarization division multiplex transmission scheme. The second polarization mode is orthogonal to the first polarization mode. The first and second data streams are combined into a single wavelength for transmission over a single optical fiber using a polarization beam combiner such that the first and second polarization modes travel independently through an optical fiber on the single wavelength. When MDM is employed, a plurality of data or protocol types may be transmitted independently using a single fiber and/or a single wavelength.

The techniques described herein provide several advantages. For example, there is no need to have a converged digital layer between heterogeneous traffic types (packet, TDM, etc.) or between asynchronous version of the same protocol. There is no need to implement additional protocols that add overhead and complexity (generic framing procedure (GFP), generic mapping procedure (GMP), pseudo wires, etc.), that waste bandwidth.

Packet traffic streams inherit OAM and fault propagation provided by TDM technology (SONET/SDH or OTN), and thereby provides a well known, stable, and reliable solution. Since the staff is already trained fir TDM, the operational expenses are reduced because there is no need train staff on new provisioning and OAM suites. This carrier class solution is widely accepted by numerous service operators. There is no need to invent, standardize, implement new protocols, and no need for new or dedicated hardware in the packet data path.

By removing dedicated hardware in the packet data path, e.g., dedicated ASICs, there is less power consumption on both the transmitter and the receiver, and there is one less digital processing step for mapping and demapping traffic over convergence and common framing layers. Removing both integrated circuit chips and processing steps also reduces network latency. Many applications such as financial, video, voice, online gaming, among others, are latency dependent, and network operators are very sensitive to the demands of their clients with regard to these near real-time applications. The techniques provide a single solution that supports legacy and future transport platforms.

The above description is intended by way of example only.

What is claimed is:

1. A method comprising:
   receiving a first data stream that is encapsulated for transport using a first transport protocol;
   receiving a second data stream that is encapsulated for transport using a second transport protocol, wherein the first and second data streams are generated without a common framing layer;
   adjusting a transmission data rate of the first or second data streams in order to configure the first and second data streams for synchronous transmission;
   modulating the first data stream on a wavelength with a first polarization mode of a polarization division modulation scheme to produce a first modulated data stream with the first polarization mode; and
   modulating the second data stream on the wavelength with a second polarization mode of the polarization division multiplex transmission scheme to produce a second modulated data stream with the second polarization mode, wherein the second polarization mode is orthogonal to the first polarization mode.

2. The method of claim 1, further comprising generating the first data stream independently from the second data stream.

3. The method of claim 1, further comprising generating the first data stream for time division multiplex network transmission and the second data stream for packet switched network transmission.

4. The method of claim 3, wherein adjusting comprises adjusting a transmission rate of the second data stream for clock recovery at a receiver using a single clock recovery mechanism for optical to electrical conversion of the first and second data streams.

5. The method of claim 1, wherein generating the first and second data streams without a common framing layer includes generating the first and second data streams without a packet based or time division multiplex based convergence layer.

6. The method of claim 1, wherein modulating the first data stream and modulating the second data stream comprises modulating according to one or more of an N-quadrature amplitude modulation scheme and an N-phase shift keying modulation scheme.

7. The method of claim 1, further comprising combining the first and second modulated data streams for transmission over a single optical fiber using a polarization beam combiner such that the first and second polarization modes travel independently through the optical fiber on the wavelength.

8. The method of claim 1, wherein modulating the first data stream comprises modulating the first data stream for transmission over a first propagation mode in a multimode division multiplexing scheme, and wherein modulating the second data stream comprises modulating the second data stream for transmission over a second propagation mode in a multimode division multiplexing scheme.

9. The method of claim 8, further comprising launching the first and second data streams onto a single optical fiber using a multimode beam combiner, wherein the first and second propagation modes travel independently through optical fiber.

10. An apparatus comprising:
one or more input units configured to:
receive a first data stream that is encapsulated for transport using a first transport protocol;
receive a second data stream that is encapsulated for transport using a second transport protocol, wherein the first and second data streams are generated without a common framing layer;
a data transmission rate adaptation unit configured to adjust a data rate of the first or second data streams for synchronous; and
one or more optical modulators configured to:
modulate the first data stream on a wavelength with a first polarization mode of a polarization division modulation scheme; and
modulate the second data stream on the wavelength with a second polarization mode of the polarization division multiplex transmission scheme, wherein the second polarization mode is orthogonal to the first polarization mode.

11. The apparatus of claim 10, further comprising one or more digital-to-analog converters configured to convert the first and second data stream into analog signals.

12. The apparatus of claim 10, further comprising a polarization beam combiner configured to combine outputs of the one or more optical modulators for transmission over a single optical fiber.

13. The apparatus of claim 10, wherein the one or more optical modulators are configured to modulate the first and second data streams for transmission over a respective modes of a single optical fiber in a multimode division multiplexing scheme, and further comprising a multimode beam combiner configured to launch outputs of the one or more optical modulators onto the single optical fiber.

14. The apparatus of claim 10, wherein the data transmission rate adaptation unit is configured to adjust a data transmission rate of the first data stream to match a data transmission rate of the second data stream.

15. A system comprising the apparatus of claim 14, and further comprising a receiver with a single clock recovery unit configured to recover the first and second data streams using the single clock recovery unit.

16. A method comprising:
receiving a first data stream that is encapsulated using a first protocol;
receiving a second data stream that is encapsulated using a second protocol, wherein the first and second data streams are generated without a common framing layer;
adjusting a transmission data rate of the first or second data streams in order to configure the first and second data streams for synchronous;
modulating the first data stream on a first transmission mode of a single optical fiber to produce a first modulated data stream;
modulating the second data stream on a second transmission mode of the single optical fiber to produce a second modulated data stream; and
combining the first and second modulated data streams according to the first and second transmission modes of the single optical fiber.

17. The method of claim 16, further comprising generating the first data stream independently from the second data stream.

18. The method of claim 16, further comprising generating the first data stream for time division multiplex network transmission and the second data stream for packet switched network transmission.

19. The method of claim 16, wherein generating the first and second data streams without a common framing layer includes generating the first and second data streams without a convergence layer.

20. The method of claim 16, wherein combining comprises combining the first and second modulated data streams for transmission over the single optical fiber using one of a polarization beam combiner and a multimode beam combiner.

* * * * *